May 13, 1941.　　O. W. FRY ET AL　　2,241,453
AXLE STRUCTURE
Filed Sept. 12, 1938
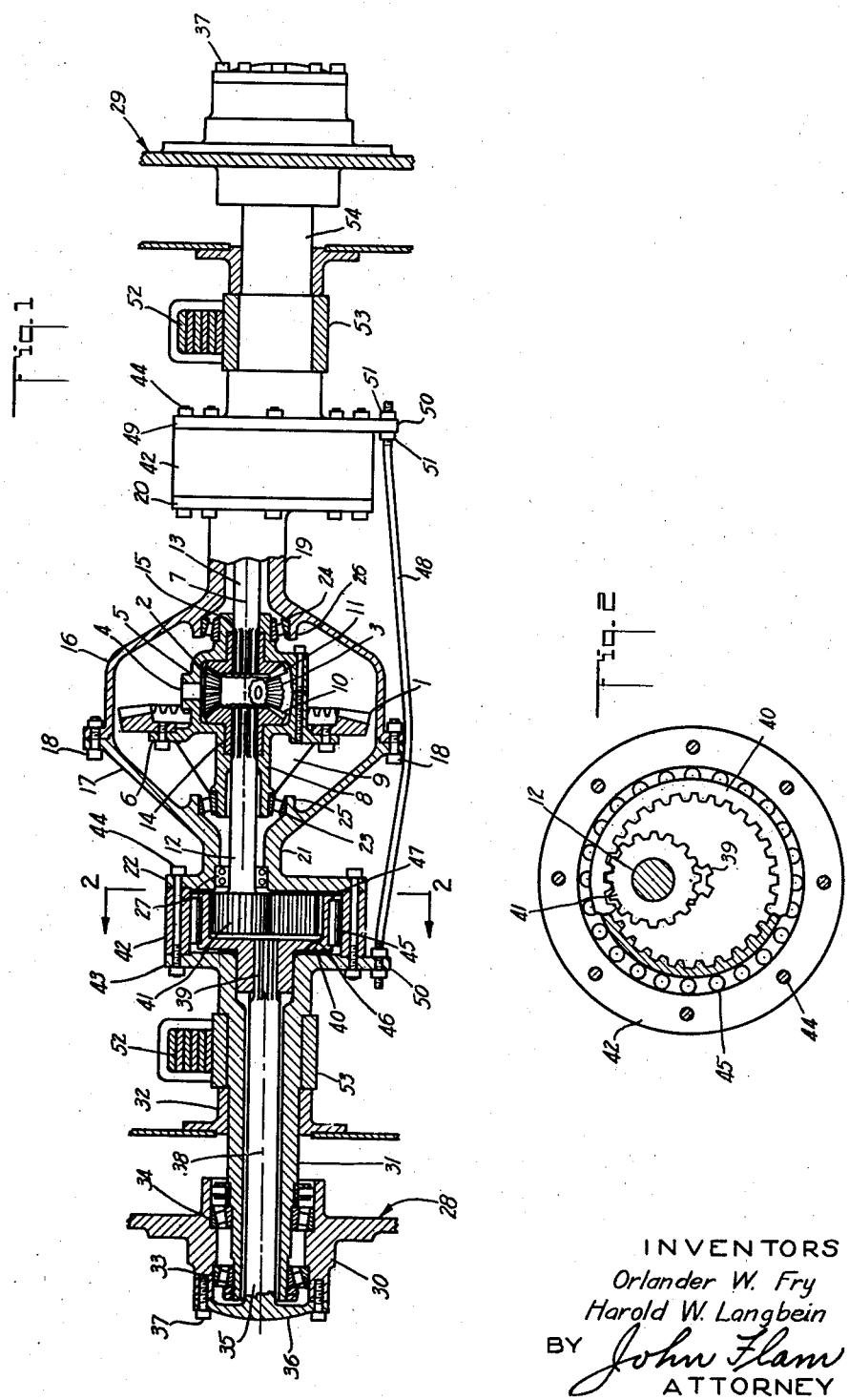
INVENTORS
Orlander W. Fry
Harold W. Langbein
BY *John Flam*
ATTORNEY

UNITED STATES PATENT OFFICE 2,241,453

AXLE STRUCTURE

Orlander W. Fry and Harold W. Langbein, Los Angeles, Calif.

Application September 12, 1938, Serial No. 229,584

3 Claims. (Cl. 74—314)

This invention relates to automobile axle structures, and particularly to rear drive axles for motor trucks.

It is common, in structures of this character, to provide a propeller shaft driven by the engine, which in turn drives a ring bevel gear by a bevel pinion. The ring gear forms an element of a differential gear mechanism. From the differential extend a pair of axles to which the two rear wheels are respectively attached. Provisions are made for rotatably supporting each wheel axle in the axle housing, which is joined to the body by the usual leaf springs. The wheels are also rotatably supported on the sleeves forming a part of the axle housing.

Such an arrangement may be quite satisfactory for passenger automobiles. However, in truck equipment, the weight imposed by the truck load on the rear axles is often very severe, resulting in substantial distortion of the axle housing. This has the effect of flexing the axle shaft, which rotating under such conditions is subject to rapid crystallization. This bending of the axle shaft also throws a severe load on the wheel bearings, resulting in breakage or rapid wear.

It is a principal object of this invention to provide a rear axle structure in which the distortion of the axle housing, due to loading or other causes, is prevented from springing the axle shaft.

And as these wheel bearings become loose from wear, the wheels tend to disk outwardly, that is their treads are farther apart than their hubs, on account of the load, which further aggravates the springing of the axle shaft.

It is accordingly another object of this invention to reduce the harmful effects that may be occasioned by worn wheel bearings.

It is another object of this invention to improve in general the construction of rear axle structures.

It is still another object of this invention to provide a simple form of gear between the differential and each wheel. Such a gear is especially advantageous for trucks as usually these trucks are geared too high, with attendant limitations on the maximum driving torque that may be exerted on the rear wheels.

This invention possesses many other advantages, and has other objects which may be made more apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Fig. 1 is a view, mainly in longitudinal section, of a rear axle structure for an automobile truck, and incorporating the invention, the wheel structures being partly broken away; and Fig. 2 is a sectional view taken along plane 2—2 of Fig. 1.

In the present instance there is shown a rear axle drive including bevel ring gear 1. This gear is adapted to be driven through an appropriate propeller shaft by the automobile engine in a well understood manner. It is arranged to drive a conventional differential gear train. For this purpose gear 1 drives, in a planetary manner, a plurality of bevel gears 2, 3, etc. These gears are arranged to rotate on axes radial to axis 7 of the ring gear 1. These axes are angularly spaced in a uniform manner around main axis 7. Each of the gears 2, 3, etc. may be provided with a stub shaft 4 appropriately rotatably supported in a frame 5. This frame 5 has a flange 6 by the aid of which it may be joined to the ring gear 1. Thus as ring gear 1 is rotated the bevel gears 2, 3, etc. are caused to describe a planetary path around the axis 7 of the gear 1.

The frame 5 also includes a hub-like extension 8. For the sake of providing sufficient rigidity to the frame, several ribs 9 may be provided between the hub structure 8 and the flange 6.

The bevel gears 2, 3, etc. are shown as in driving relation to oppositely directed bevel gears 10 and 11, thus completing a differential gear mechanism. Each of these bevel gears 10 and 11 is coaxial with the axis 7 of ring gear 1.

In a conventional differential mechanism, the gears corresponding to the gears 10 and 11 are attached to their respective axles which are directly connected to the wheel structures at opposite sides of the vehicle. In the present instance, however, and in accordance with this invention, there is a material variation from such arrangement. Thus axles 12 and 13, respectively connected to the bevel gears 10 and 11, are rather short, and extend only part way toward the side of the vehicle. These axles 12 and 13 are appropriately connected to the gear wheels 10 and 11, as by the aid of splines. They are furthermore shown as provided with hubs, such as 14 and 15, rotatable within appropriate cylindrical surfaces in the frame 5.

Before describing in detail how the axles 12 and 13 exert a driving torque upon the wheel structures, the manner in which the differential gear mechanism thus far described is mounted in its housing will be set forth.

The differential gear housing includes the halves 16 and 17, having contacting flanges bolted together as by the bolts 18. This housing surrounds the ring gear 1 as well as the frame 5 with the gear elements 2, 3, 10 and 11. The half 16 is provided with a tubular extension 19 ending in a flange 20; and the half 17 is provided with a tubular extension 21 ending in a flange 22. The axles 12 and 13 extend respectively through the tubular extensions 21 and 19, and have clearance therein.

Appropriate anti-friction bearings may be provided between this differential gear mechanism housing 16—17 and the rotating element of the differential gear structure. Thus for example roller bearing structures 23 and 24 may be provided between the frame 5 and the overhanging flanges 25 and 26 respectively in the housing members 17 and 16. Also, a double row ball bearing structure 27 may be provided for each of the axles 12 and 13 between the axle and the corresponding tubular extension 21 or 19. This differential gear structure and its housing, are more or less common in automobile rear axle drives and further detailed description thereof is unnecessary. The housing 16—17 may be filled with an appropriate plastic lubricant.

Instead of having a direct connection with the wheel structures 28 and 29 at opposite sides of the vehicle, the axles 12 and 13 are connected through a reduction gearing to these wheel structures respectively. Since the construction of the mechanism between axle 12 and the wheel structure 28 is identical with that between axle 13 and wheel structure 29, but one of these constructions need be described in detail.

The wheel structure 28 is shown as having a hub 30 mounted for free rotation on a sleeve 31 of the axle housing. This axle sleeve 31 is tubular and forms virtually an extension of the differential gear housing 16—17. A hub 32 is indicated spaced from the hub 30 for appropriately supporting the brake mechanism (not shown). Between the hub 30 and the stationary housing 31 there are provided the usual roller bearing structures 33 and 34. The axle shaft 35 extends through the sleeve 31 and is provided with an integral end cap or flange 36. This flange is directly attached to the hub 30 of the wheel structure 28 as by the aid of the cap screws 37.

The axle shaft 35 is shown as having an axis 38 spaced below the axis 7 of the differential gear axles 12 and 13. The right hand extremity of the axle 35 is connected as by splines 39 to the hub of an internal type gear 40. This gear is shown to best advantage in Fig. 2. Meshing with the internal teeth of the gear 40 is a pinion 41 attached to the axle 12. Accordingly the drive from axle 12 to wheel 28 includes the pinion 41, the gear 40 and axle shaft 35. A similar reduction gearing is provided between axle 13 and wheel structure 29. This reduction gearing is of material benefit in connection with truck drives. Such truck drives are usually required to exert a very heavy driving torque when they are fully loaded. By the aid of the reduction gearing interposed between the axles 12 and 35 the torque requirements are easily attained.

In order to enclose the reduction gearing, an enclosing ring 42 surrounds the external surface of the gear 40. It may be joined to the differential gear housing flange 22 and to a similar flange 43 on housing 31, as by the aid of the through bolts 44.

In order to support the gear 40 adequately, roller bearings 45 are interposed between the exterior surface of the gear 40 and the internal surface of the ring 42. The external surface of the gear 40 may be appropriately grooved for retaining these bearings 45 against axial movement. Furthermore, bronze washers 46 and 47 may be utilized on opposite sides of the housing formed by the ring 42 and flanges 22 and 43 to maintain proper axial spacing of the gearing and also to provide an enclosure to retain lubricant within the ring 42.

One or more stay bolts 48 extend between the flange 43 and the corresponding flange 49 at the right hand portion of the structure. This stay bolt 48 may be passed through clearance apertures in ears 50 projecting below the flanges 43 and 49. Nuts 51 may be used to maintain the stay bolt in position.

Not only is the reduction gearing comprising the pinion 41 and gear 40 of utility in transmitting adequate torque to the corresponding axle shaft, but the interposition of this connection between the axles 12 and 35 has another highly advantageous effect. The reduction gearing is so located that, any looseness in the wheel bearings 33 and 34 will not produce any deleterious cramping or bending effect upon the corresponding inner axle 12.

The housing structure with the axles therein may support the vehicle chassis as by the interposition of leaf spring structures 52 shown diagrammatically in Fig. 1 as resting upon spring anchor collars 53. These spring anchor collars surround the respective axle housings 31 and 54. By virtue of the fact that the reduction gearing is interposed between the spring structure 52 and the differential, the axle shaft 35 is permitted to have some slight play, as the wheel bearings wear loose, without appreciably disturbing proper intermeshing of gear teeth between pinion 41 and gear 40.

What is claimed is:

1. In a mechanism for transmitting power to a pair of coaxial driving wheels of an automotive vehicle through an interposed differential gear mechanism, including an axle housing by means of which the wheels carry a load, said load being applied to the housing at corresponding places on opposite sides of the differential between the differential and the wheels, said axle housing having oppositely directed drive axles respectively for each wheel, pinions carried respectively by the outer ends of the drive axles, internal gear wheels respectively driven by said pinions, driven axles respectively axially alined with said internal gear wheels and in driving relation therewith, means to permit free relative axial movement between each gear wheel and its associated shaft, said axle housing including sleeves for the driven axles and bearing means to support each of said gear wheels in the housing independently of the associated driven axle, said internal gear wheels and their cooperating pinions being located respectively adjacent the points of said axle housing liable to greatest flexure in response to said load.

2. In a mechanism for transmitting power to a pair of coaxial driving wheels of an automotive vehicle through an interposed differential gear mechanism, including an axle housing by means of which the wheels carry a load, said load being applied to the housing at corresponding places on opposite sides of the differential between the differential and the wheels, said axle housing having oppositely directed drive axles respectively for each wheel, pinions carried respectively by the outer ends of the drive axles, internal gear wheels respectively driven by said pinions, driven axles respectively axially alined with said internal gear wheels and in driving relation therewith, means to permit free relative axial movement between each gear wheel and its associated shaft, said axle housing including sleeves for the driven axles, rolling bearings interposed respectively between the external surface of each internal gear wheel and the housing, whereby to support said gear wheels independently of the associated driven axles, and means to maintain each of said gear wheels against axial movement with respect to the housing, said internal gear wheels and their cooperating pinions being located respectively adjacent the points of said axle housing liable to greatest flexure in response to said load.

3. In a mechanism for transmitting power to a pair of coaxial driving wheels of an automotive vehicle through an interposed differential gear mechanism, including an axle housing by means of which the wheels carry a load, said load being applied to the housing at corresponding places on opposite sides of the differential between the differential and the wheels, said axle housing having oppositely directed drive axles respectively for each wheel, pinions carried respectively by the outer ends of the drive axles, internal gear wheels respectively driven by said pinions, driven axles respectively axially alined with said internal gear wheels, and joined thereto by a splined connection, whereby to permit relative axial movement between each gear wheel and its shaft, said axle housing including sleeves for said driven axles, bearing means to support each of said gear wheels in the housing independently of the associated driven axle, said internal gear wheels and their cooperating pinions being located respectively adjacent the points of said axle housing liable to greatest flexure in response to said load, and bearings mounted exteriorly upon each of said sleeves adjacent the outer end thereof for supporting respectively said driving wheels, said driven axles being joined respectively to the driving wheels.

ORLANDER W. FRY.
HAROLD W. LANGBEIN.